United States Patent Office 2,759,870
Patented Aug. 21, 1956

2,759,870

COMPOSITIONS CONTAINING FOLIC ACID

Harold L. Newmark, Brooklyn, N. Y., assignor to The Vitarine Company, Inc., New York, N. Y., a corporation of New York No Drawing. Application October 23, 1952,
Serial No. 316,551

2 Claims. (Cl. 167—81)

This invention relates to new and improved compositions containing folic acid and has particular relation to solutions which contain dissolved folic acid at a pH below 7.0 and are stable by themselves, as well as in the presence of certain other substances, particularly B complex vitamins, in the solution.

It has been known that folic acid is only very slightly soluble in aqueous solutions at neutral reaction or acid pH ranges. According to Biamonte and Schneller (Journal of the American Pharmaceutical Association, Scientific Edition, vol. XL, No. 7, July 1951), the solubility of folic acid in water is negligible below a pH=5.0 and amounts to about 2 mg. per cm.$^3$ at a pH=6.0. Furthermore, Biamonte and Schneller have also found (see l. c.) that decomposition of folic acid in acid aqueous solutions is very rapid in the presence of several members of the B complex vitamin group, particularly riboflavin and thiamin. This is true even though concentrations of the folic acid present in said solution are very low.

It has been suggested previously to prepare aqueous solutions of folic acid with the addition to the solution of niacinamide, glycine, methyl glucamine, sucrose, dextrose, sorbitan. These substances increase the solubility of folic acid in water having a pH lower than 7.0, and the relatively best effect can be obtained by the presence of 10% niacinamide in the solution. However, even in the presence of niacinamide, the highest folic acid concentration obtainable at a pH=6.0 is only 5 mg. per cm.$^3$ of the solution.

The main object of the present invention is to prepare aqueous solutions which, at a pH below 7.0, contain a relatively high amount of folic acid and are stable by themselves as well as in the presence of other substances, particularly B complex vitamins, in the solution.

Other objects and the advantages of the invention will be apparent from the appended claims and the following specification, which describes by way of example, and without limitation some embodiments of the invention.

It has been found that aqueous compositions or solutions having a pH below 7.0 and containing increased amounts of folic acid can be prepared and such solutions are practically stable on storage by themselves, as well as in the presence of vitamins of the B complex group in the solutions, if a suitable amount of gentisic acid ethanolamide is present in said solutions.

For example, a stable aqueous composition which contains 5 mg. of folic acid per cm.$^3$ at a pH=5.0 at room temperature of 15°–25° C. is obtained if 2.5% by weight of gentisic acid ethanolamide is present in the solution. Other examples are: an aqueous solution containing 3% gentisic acid ethanolamide and 10 mg. of folic acid per cm.$^3$ at a pH=5.4 at room temperature; an aqueous solution containing 3% gentisic acid ethanolamide and 20 mg. of folic acid per cm.$^3$ at a pH=6.0 at room temperature; an aqueous solution containing 3% of gentisic acid ethanolamide and 40 mg. of folic acid per cm.$^3$ at room temperature at pH=6.5.

The pH of the composition embodying the present invention is sufficiently low to permit the addition of other B complex substances with the formation of practically stable compositions.

Thus, one or more of the following substances, which are stable only in slightly acid media, can be incorporated in the compositions of the invention:

Cyanocobalamin (vitamin $B_{12}$ U. S. P.),
Liver for injection U. S. P.,
Thiamin chloride,
Riboflavin,
Pyridoxine hydrochloride,
Pantothenic acid and its salts,
Niacinamide,
Choline chloride,
Iron peptonate-N. F.,
Iron nucleate,
Panthenol.

The compositions of the present invention can be prepared by various procedures. For example, gentisic acid ethanolamide is dissolved in distilled water. The folic acid is then suspended in the solution, in the presence or absence of buffering agents, and the mixture is heated until dissolution. The pH is adjusted to the desired value after dissolution is complete.

According to a modified procedure, gentisic acid ethanolamide is dissolved in distilled water. To the solution sodium folate is added at room temperature and dissolved under stirring, and the pH of the solution is adjusted by the addition of dilute NaOH solution or dilute HCl solution to the desired value.

According to a preferred further modification, gentisic acid ethanolamide is dissolved in distilled water, folic acid is suspended in the solution at room temperature and the theoretical equivalent amount of NaOH (dissolved in water) necessary for neutralizing the folic acid, is added to the folic acid suspension, while stirring. After solution is complete, the pH is adjusted to the desired level by the addition of a dilute aqueous solution of HCl or NaOH.

Other substances may be added before or after the preparation of the folic acid solution, but it is preferred to add other substances after the folic acid solution of the desired concentration and pH has been prepared.

*Example 1*

6.25 gms. of U. S. P. folic acid, assaying 91% pure folic acid content is added to a solution of 15 gms. of gentisic acid ethanolamide in 450 cm.$^3$ of water. Dilute, aqueous NaOH solution is added dropwise with stirring at room temperature until a pH of 6.5–7.0 is obtained. At this point the folic acid is completely dissolved. Slow, cautious addition of dilute hydrochloric acid produces a stable solution having a pH of 5.5–6.0. The volume of the solution is now adjusted to a total of 500 cm.$^3$. This produces a concentration of 10 mg. per cm.$^3$ of folic acid, with a pharmaceutically acceptable excess of about 15%. The solution is of good stability. It shows no appreciable decomposition after storage at 45° C. for three weeks, or after room temperature storage for five months.

*Example 2*

To the solution prepared according to Example 1, vitamin B–12 U. S. P. (cyanocobalamin) is added in an amount of 0.01 gm. per 100 cm.$^3$ of the solution, or in a suitable higher quantity.

Potency tests show that the resulting solution is stable after storage at 45° C. for three weeks.

*Example 3*

15 gms. of gentisic acid ethanolamide are dissolved in 450 cc. of liver for injection U. S. P. and to the solution 6.25 gms. of folic acid U. S. P. of 91% purity are added. Upon adding dropwise dilute NaOH solution up to a pH of 6.5 to 7.0 and stirring, complete dissolution is obtained. The pH of the resulting solution is now adjusted to a pH of 5.5–6.0 with dilute hydrochloric acid, and the desired amount of crystalline U. S. P. vitamin B–12, e. g. 0.1 gm. per cm.$^3$, is dissolved in the solution. The total volume of the latter is adjusted to 500 cm.$^3$ by the addition of liver for injection U. S. P.

The composition, which contains folic acid, liver for injection, and vitamin B–12, is stable after storage at 45° C. for three weeks. Vitamin B–12 may be omitted from the composition, if desired.

*Example 4*

To the composition prepared according to any of the above Examples 1–3, iron in the non-ionic complex soluble form may be added. For example, iron peptonate can be incorporated in any of said compositions by adding 10–20 mgs. of iron peptonate per cm.$^3$ to the final solution at pH=6.0. Instead of iron peptonate, other iron compounds, e. g. iron nucleate or a compound of the class called Versenes, can be used.

For certain therapeutic purposes, a composition, which can be administered per os or parenterally, and contains a combination of folic acid and vitamins of the B complex, particularly B–12 vitamin (which is stable in acid media only), is needed. The present invention provides such compositions in the necessary concentrations and in stable form, and represents, therefore, a valuable contribution to the art.

It will be understood that the present invention is not limited to the above described specific details and can be carried out with various modifications. For example, while it is preferred to use the gentisic acid ethanolamide in a concentration of about 3.0% by weight in the compositions of the invention, lower or higher concentrations, e. g. 2.5% or 4–5%, can also be used. The pH of the compositions according to the invention is lower than 7.0 and the range lower than 7.0 including 5.0 is preferred. The solubilizing and stabilizing effect of gentisic acid ethanolamide is highly satisfactory, but other solubilizing or stabilizing agents may also be present in the compositions. Prior to final adjustment of the pH, the composition may have a pH somewhat higher than 7.0, i. e. 7.5 to 8.0. These and other modifications may be made without departing from the scope of the invention as defined in the appended claims.

What is claimed is:

1. As a new composition of matter, an aqueous solution of folic acid, said solution having a pH lower than 7.0, containing gentisic acid ethanolamide in an amount which is sufficient to solubilize and stabilize the folic acid, the amount of folic acid in the solution exceeding that normally soluble in water under otherwise equal conditions of temperature and pH but in the absence of gentisic acid ethanolamide.

2. As a new composition of matter, an aqueous solution of folic acid, said solution having a pH lower than 7.0, containing gentisic acid ethanolamide in an amount which is sufficient to solubilize and stabilize the folic acid, said solution also containing riboflavin, the amount of folic acid in the solution exceeding that normally soluble in water under otherwise equal conditions of temperature and pH but in the absence of gentisic acid ethanolamide.

References Cited in the file of this patent

UNITED STATES PATENTS 2,463,461   Hoffer _____ Mar. 1, 1949

OTHER REFERENCES

Howard: Modern Drug Encyclopedia, 5th Ed. (February 1952), pages 402, 403, 849, 1085.